No. 733,554. PATENTED JULY 14, 1903.
C. MORGAN.
MOP.
APPLICATION FILED JULY 1, 1902.
NO MODEL.
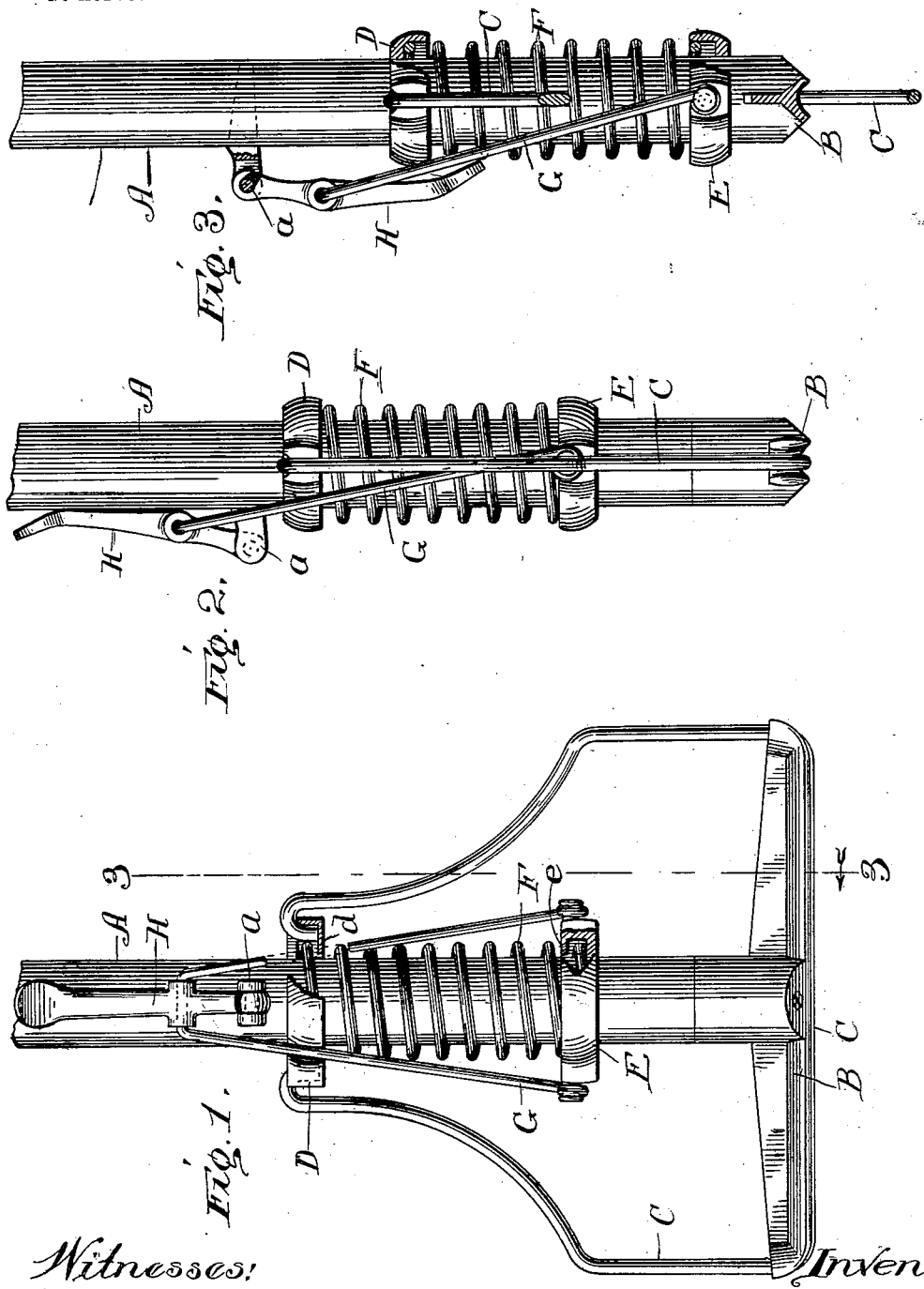
Witnesses:
Chas O. Shurvey,
S. Bliss
Inventor:
Charles Morgan
by A. V. Petner
Atty.

No. 733,554. Patented July 14, 1903.

UNITED STATES PATENT OFFICE.

CHARLES MORGAN, OF FREEPORT, ILLINOIS, ASSIGNOR TO ARCADE MANUFACTURING COMPANY, OF FREEPORT, ILLINOIS, A CORPORATION OF ILLINOIS.

MOP.

SPECIFICATION forming part of Letters Patent No. 733,554, dated July 14, 1903.

Application filed July 1, 1902. Serial No. 113,926. (No model.)

*To all whom it may concern:*

Be it known that I, CHARLES MORGAN, a citizen of the United States of America, residing at Freeport, in the county of Stephenson and State of Illinois, have invented certain new and useful Improvements in Mop-Heads, of which the following is a specification.

My invention relates to certain new and useful improvements in mops; and its object is to produce a mop of the type wherein the bail is yieldingly pressed toward the T-head, so as to accommodate swabs of various sizes.

I have endeavored to produce a mop which shall be extremely simple and cheap and which shall in addition present a handsome appearance.

To these and certain minor ends my invention consists in the novel features of construction shown in the accompanying drawings and described in this specification.

In the above-mentioned drawings, Figure 1 is a front elevation of my improved mop. Fig. 2 is a side elevation, and Fig. 3 is a longitudinal section in the line 3 3 of Fig. 1, showing certain parts in a different position.

Referring to the drawings, A is a mop stick or handle, and B is the ordinary cross-head supported thereby. The cross-head is provided with a groove, as is customary in all mops, and has notches at the ends to guide a suitable bail C of the form shown. The bail extends longitudinally of the handle and converges toward the same in suitable curves and is connected to a collar D, which runs loose upon the handle A. A second collar E also runs loose upon the handle, and between these collars is a coiled spring F, which tends to force them apart.

Pivotally connected to the collar E is a link G, extending toward and beyond the collar D, and this link is pivotally connected to a lever H. Said lever is fulcrumed upon a bracket *a*, secured upon the handle A and extending laterally therefrom, so that when the parts of the mop are in the position shown in Figs. 1 and 2 the link G will lie nearer the handle than the fulcrum of the lever H, thereby keeping the lever locked in that position and preventing any accidental displacement thereof.

The operation of this mop is substantially as follows: The lever H draws the link G and the collar E toward the collar D, thereby exerting on said collar by means of the spring F a yielding force the direction of which is away from the cross-head B. This force is transmitted from the collar D to the bail C, thereby bringing said bail firmly into contact with said cross-head. When the lever H is moved away from the handle A, and so separates the collar E and the collar D, the collar E moves independently of the collar D until the limit of elasticity of the spring F is reached. When this limit is reached, however, the spring F draws the collar D with it, the continuous motion of the lever thereby bodily moving both the collars toward and the upper part of the bail away from the cross-head. This of course permits the ready insertion of a suitable swab.

In order to prevent the collar E from moving too far away from the collar D, a suitable stop is provided. In this case it consists of the spring itself, which is connected at each of its ends to the collars D and E, respectively. It is evident, however, that it would be quite possible to put in a number of different kinds of stops to prevent the undue separation of these collars. As shown, inwardly-extending lugs *d e* are formed upon the collars, which serve the purpose.

I realize that considerable variations can be made in the details of this construction without materially departing from the spirit of the invention, and I do not, therefore, desire to limit myself to the specific form shown and described.

I claim as new and desire to secure by Letters Patent—

1. In a device of the class described, the combination with a handle and a cross-head supported thereon, of a bail running over said cross-head, a spring connected to said bail, a lever pivoted upon said handle and a minor bail connecting said lever to the end of said spring opposite to its point of connection with said first-mentioned bail, substantialy as described.

2. In a device of the class described, the combination with a handle and a cross-head secured thereto, of a bail running over said cross-head, a spring connected to the upper ends thereof, a bracket projecting laterally from said handle, a lever pivoted to said bracket and a minor bail connecting said lever to the end of said spring opposite to its point of connection with said first-mentioned bail, said minor bail swinging past the pivotal point of said lever in said bracket when said lever is thrown toward said handle, substantially as described.

3. In a device of the class described, the combination with a handle and cross-head mounted thereon, of a bail running over said cross-head, a spring connected to the ends of said bail and between said bail and said cross-head, a bracket projecting laterally from said handle above the ends of said bail, a lever pivoted thereon, and a minor bail running from said lever to the end of said spring adjacent to said cross-head, whereby when said lever is thrown toward said stick, said spring will be compressed and the device locked, substantially as described.

4. In a device of the class described, the combination with a handle and cross-head thereon, of a bail running over said cross-head, a ring movable upon said handle and connected to said bail, a second ring between said first ring and said cross-head, a spring interposed between said rings and means for forcing said second ring away from said cross-head, and locking it in this position, substantially as described.

5. In a device of the class described, the combination with a handle and cross-head supported thereby, of a bail running over said cross-head, a ring connected to the end of said bail, a second ring between said first ring and said cross-head, a spring interposed between said rings, a lever pivoted upon a fulcrum fixed in said handle above said first ring and means of connection between said lever and said second ring whereby the motion of said lever may draw said second ring away from said cross-head, substantially as described.

6. In a device of the class described, the combination with a handle and cross-head supported thereby, of a bail running over said cross-head, a ring connected to the end of said bail, a second ring between said first ring and said cross-head, a spring interposed between said rings, a lever pivoted upon a laterally-extending fulcrum fixed on said handle above said first ring, a minor bail running from said lever to said second ring, said bail swinging past the fulcrum-point of said lever when said lever is thrown against said stick, substantially as described.

7. In a device of the class described, the combination with a handle and cross-head, of a bail running from said cross-head and converging toward said handle, a spring between the upper ends of said bail and said cross-head, a laterally-projecting bracket mounted on said handle, a lever pivoted to said bracket and a link connecting a medial point of said lever with the end of said spring farthest removed from its point of connection with said bail, substantially as described.

In witness whereof I have hereunto set my hand, at Freeport, in the county of Stephenson and State of Illinois, this 23d day of June, A. D. 1902.

CHARLES MORGAN.

Witnesses:
HENRY TSCHEMING,
FRED E. BOEDEKER.